United States Patent
Morimoto et al.

[11] Patent Number: 5,560,993
[45] Date of Patent: Oct. 1, 1996

[54] OXIDE-COATED SILICON CARBIDE MATERIAL AND METHOD OF MANUFACTURING SAME

[75] Inventors: Tatsuo Morimoto; Yuzuru Ogura; Masayuki Kondo; Akira Notomi, all of Yokohama, Japan

[73] Assignee: Mitsubishi Jukogyo Kabushiki Kaisha, Tokyo, Japan

[21] Appl. No.: 389,052

[22] Filed: Feb. 15, 1995

[30] Foreign Application Priority Data

Feb. 16, 1994 [JP] Japan .................. 6-019063

[51] Int. Cl.$^6$ .................................................. B32B 9/006
[52] U.S. Cl. .................. 428/408; 428/446; 428/698; 428/701; 501/152; 420/416; 420/578
[58] Field of Search .................. 428/446, 408, 428/688, 689, 697, 698, 701, 702; 420/416, 578; 106/14.05, 287.1, 287.18; 501/152, 154

[56] References Cited

U.S. PATENT DOCUMENTS

| | | | |
|---|---|---|---|
| 3,873,307 | 3/1975 | Morrice, Jr. | 420/416 |
| 3,953,579 | 4/1976 | Herchenroeder | 423/263 |
| 4,487,799 | 12/1984 | Galasso | 428/334 |
| 5,074,935 | 12/1991 | Masumoto | 148/403 |

OTHER PUBLICATIONS

Abstract of Japanese Patent Provisional Publication No. 3-221444, Sep. 9, 1991.

Abstract of Japanese Patent Application No. 4-202230, Feb. 22, 1994.

*Primary Examiner*—Ellis Robinson
*Assistant Examiner*—Leonidas J. Jones, III
*Attorney, Agent, or Firm*—Foley & Lardner

[57] ABSTRACT

A lanthanoid silicide-coated silicon carbide material whereof the surface is coated with a silicide, this silicide being a reaction product of an oxide of a lanthanoid rare earth element or yttrium with silicon carbide, or a reaction product of a compound oxide of a lanthanoid rare earth element or yttrium and silicon with silicon carbide; and a lanthanoid silicide-coated silicon carbide as above whereof the surface is further coated with an oxide of a lanthanoid rare earth element or yttrium, or with a compound oxide of a lanthanoid rare earth element or yttrium and silicon.

18 Claims, 1 Drawing Sheet

OXIDE-COATED SILICON CARBIDE MATERIAL AND METHOD OF MANUFACTURING SAME

FIELD OF THE INVENTION

This invention relates to a lanthanoid rare earth oxide-containing film-coated silicon carbide material that may advantageously be employed as a heat-resistant structural material in space shuttles, next-generation supersonic passenger aircraft, engine parts and gas turbines, to a lanthanoid silicide-coated silicon carbide material precursor, and to a method of manufacturing a lanthanoid rare earth oxide-containing film-coated silicon carbide material.

Silicon carbide materials which are coated with layers of various metal oxides having excellent anti-oxidation properties have been proposed to improve the anti-oxidation properties of silicon carbide. However, with the exception of the silicon dioxide film formed by oxidation of the silicon carbide itself, silicon carbide has poor adhesion to metal oxide coatings, and adequate anti-oxidation properties were therefore not obtained.

In order to make metal oxide films having superlative anti-oxidation properties adhere to silicon carbide materials, a method has been proposed whereby an intermediate film is interposed between the silicon carbide and the oxide (see, for example, Japanese Provisional Patent Publication 3-221444 and Japanese Patent Application 4-202230). This method is however associated with various problems. For example, the intermediate layer proposed in Japanese Patent Publication 3-22144 consists of a metal oxide and a metal carbide, and as these two substances form a reaction product at high temperature, the layer is not very durable. Further, the method proposed in Japanese Patent Application 4-202230 has not yet specifically been applied to combinations of lanthanoid rare earth (or yttrium) oxides with silicon carbide, or to combinations of compound oxides of lanthanoid rare earth elements (or yttrium) and silicon with silicon carbide. There is also a risk that if it were applied to these combinations, depending on the composition of the intermediate layer so formed, oxidation might occur on prolonged exposure to air so that the layer disintegrated, thereby making it necessary to join the components together in an extremely short space of time.

Still further, of those metals mentioned in the prior art, yttrium and hafnium present a problem in that the thermal expansion coefficients of their oxides are different from that of silicon carbide. This gives rise to a large thermal stress when heated and adhesion becomes poor.

This invention, in view of the aforesaid technical problems, therefore aims to provide a lanthanoid rare earth oxide-containing film-coated silicon carbide material wherein a metal oxide with superior anti-oxidation properties, i.e., an oxide of a lanthanoid rare earth or yttrium, is made to strongly adhere to a silicon carbide material. It also aims to provide a method of manufacturing such a material, and further to provide a lanthanoid silicide-coated silicon carbide that is a precursor of this material.

OBJECT AND SUMMARY OF THE INVENTION

This invention comprises the following aspects of silicon carbide materials and their methods of manufacture.

(1) A lanthanoid silicide-coated silicon carbide material whose surface is coated with a silicide which is a reaction product of an oxide of a lanthanoid rare earth element or yttrium with silicon carbide, or a reaction product of a compound oxide of a lanthanoid rare earth element or yttrium and silicon with silicon carbide.

(2) A lanthanoid silicide-coated silicon carbide material as defined in aspect (1) hereinabove, wherein principal components of the silicide composition are a lanthanoid rare earth element or yttrium and silicon, the amount of carbon is 30 atomic % or less, and the amount of oxygen is 5 atomic % or less.

(3) A lanthanoid silicide-coated silicon carbide material as defined in aspect (1) or (2) hereinabove, wherein said material is produced by further coating the surface of silicide coating with a lanthanoid rare earth element or yttrium oxide, or with a compound oxide of a lanthanoid rare earth element or yttrium and silicon.

(4) A lanthanoid silicide-coated silicon carbide material as defined in any one of aspects (1) to (3) hereinabove, wherein the aforesaid silicon carbide material comprises a carbon material and silicon carbide which covers a surface of the carbon material.

(5) A lanthanoid silicide-coated silicon carbide material as defined in aspect (4) hereinabove, wherein this carbon material is a carbon/carbon composite.

(6) A method of manufacturing a lanthanoid silicide-coated silicon carbide material comprising the step of coating a surface of the lanthanoid silicide-coated silicon carbide material as defined in aspect (1) or (2) hereinabove by means of plasma spraying with an oxide of lanthanoid rare earth element or yttrium or with a compound oxide of a lanthanoid rare earth element or yttrium and silicon.

(7) A method of manufacturing a lanthanoid silicide-coated silicon carbide material comprising the steps of coating a surface of the lanthanoid silicide-coated silicon carbide material as defined in aspect (1) or (2) hereinabove by means of plasma spraying with an oxide of a lanthanoid rare earth element or yttrium or with a compound oxide of a lanthanoid rare earth element and silicon, and subjecting the material with heat treatment in air or in an inert gas atmosphere so that fineness and adhesion of the oxide of a lanthanoid rare earth element or yttrium or the compound oxide of a lanthanoid rare earth element and silicon.

In the context of this invention, the silicon carbide material may be a material consisting essentially of silicon carbide, a material whose surface is at least partially coated with silicon carbide, or a material whose surface is entirely coated with silicon carbide. An example of a material consisting essentially of silicon carbide is a material produced by sintering silicon carbide powder with silicon, boron or alumina as an additive. Almost all commercially available silicon carbides are of this type. Examples of materials whose surface is at least partially coated with silicon carbide are a carbon material plate consisting of a carbon/carbon composite or the like which is coated by means of chemical vapor deposition with silicon carbide, and a silicon nitride sintered plate which is coated by means of chemical vapor deposition with silicon carbide. Examples of materials whose at least one surface is entirely coated with silicon carbide are a carbon material coated by means of chemical vapor deposition with silicon carbide on all surfaces, a material which is coated by means of chemical vapor deposition with silicon carbide on at least one surface, and a silicon nitride sintered body which is coated by means of chemical vapor deposition with silicon carbide on one of its surfaces.

The lanthanoid silicide-coated silicon carbide material defined in the aforesaid aspects (1) and (2) is a precursor of the lanthanoid rare earth oxide-containing film-coated silicon carbides defined in the aforesaid aspects (3) to (7). In the present context, the silicon carbide material one surface of which is completely coated with a lanthanoid silicide is not limited to a silicon carbide material a surface of which is coated by the lanthanoid silicide, but refers also to a material a surface of which is only partially coated with the lanthanoid silicide. Examples of the latter case are part of the exterior surface (corresponding to a diameter of 1 meter) of a hemispherical member having a diameter of 2 meters which might be used in a space shuttle, a plate-shaped member one surface of which is coated but the edges and the other surface are not, and a pipe-shaped member whose exterior surface is coated, but whose interior surface is not.

Examples of lanthanoid rare earth elements and yttrium (as a short hand we refer these elements including yttrium collectively as Ln hereinbelow) which are a component of the lanthanoid-containing silicide defined in aspects (1) and (2) include yttrium (Y), lutetium (Lu), ytterbium (Yb), thulium (Tm), erbium (Er), holmium (Ho), dysprosium (Dy), terbium (Tb) and gadolinium (Gd), but yttrium and ytterbium are to be preferred in that order from the viewpoint of cost.

The lanthanoid silicide defined in aspects (1) and (2) comprises a substance that is formed by chemical reaction of silicon carbide with an Ln oxide Its principal components are an Ln and silicon, and the remainder are carbon and oxygen. In this context, the Ln oxide is meant to include Ln oxides and compound oxides of an Ln and silicon. Disintegration of the lanthanoid silicide is suppressed by limiting the amount of carbon in the composition to a maximum of 30 atomic %, and limiting the amount of oxygen in the composition to a maximum of 5 atomic %, as shown in aspect (2) above.

The silicon carbide coated with the lanthanoid silicide of aspects (1) and (2) may be manufactured by an interface reaction of an Ln oxide or a compound oxide of an Ln and silicon with silicon carbide by means of sputtering, or by coating of a slurry followed by firing. These lanthanoid silicides are produced as interface reaction products of an Ln oxide or a compound oxide of Ln and silicon with silicon carbide. They therefore easily adhere to silicon carbide which is one of the materials used, and also easily adhere to the Ln oxide or compound oxide of Ln and silicon used in the manufacture of the target material, i.e., a lanthanoid rare earth oxide-containing film-coated silicon carbide material (referred to hereinafter as Ln oxide-containing film-coated silicon carbide material).

The Ln oxide-containing film-coated silicon carbide material of aspect (3) above is formed by coating an Ln oxide or a compound oxide of Ln and silicon on the surface of a silicon carbide material which is covered with a lanthanoid silicide (referred to hereinafter as an Ln silicide) defined in aspects (1) and (2) and has superlative anti-oxidation properties. These Ln oxides and compound oxides of an Ln and silicon function as a high barrier to oxygen. This barrier function means the difficulty with which oxygen atoms diffuse or pass through a film of a given substance. The anti-oxidation properties are when it is more difficult for the atoms to pass. Yttrium shows the highest barrier effect.

Further, as the Ln silicide is already formed on the surface of the silicon carbide material, a Ln oxide-containing film coating having a strong adhesion to the silicon carbide material may be formed by coating the silicide with Ln oxide or a compound oxide of an Ln and silicon having excellent anti-oxidation properties. In particular, in the case of compound oxides (silicates) where the Ln is yttrium, ytterbium, dysprosium or erbium, and the thermal expansion coefficient of the oxides is effectively identical to that of the substrate, i.e., approximately $5 \times 10^{-6}/°$ C. Hence even under high temperature conditions almost no thermal stress is produced, and still better adhesion properties are therefore obtained.

According to aspects (4) and (5) above, a carbon material such as a carbon/carbon composite is used as a substrate, and its surface is coated with an Ln oxide or a compound oxide of an Ln and silicon of aspects (1) to (3). The resulting combination also has the lightweightness, high strength and heat resisting properties of the carbon material, and is extremely useful as a functional material to be used under severe conditions.

Aspects (6) and (7) above relate to methods of manufacturing the Ln oxide-containing film-coated silicon carbide of aspect (3). According to these methods, the surface of the coated silicon carbide material of aspects (1) and (2) above is coated with an Ln oxide or a compound oxide of an Ln and silicon by means of plasma spray coating. In general, this procedure is performed by thermal spray coating under atmospheric pressure using argon and helium as plasma gas, and argon as carrier gas. Aspect (7) above involves, after the Ln oxide or compound oxide of an Ln and silicon is thermal spray coated on the silicon carbide material which acts as a precursor to the materials according to aspects (1) and (2) by the plasma spraying in accordance with aspect (6) above, a heat treatment which is performed in order to make the spray-coated layer adhere even more strongly to the silicon carbide material. This heat treatment may be performed in air or in an inert gas atmosphere. The required temperature, time and other conditions of this heat treatment cannot be specified uniquely as they depend on the type of silicon carbide material precursor and on the type of the Ln oxide or compound oxide of an Ln and silicon. As an example, however, the heat treatment may comprise heating in argon gas at 1700° C. for 1 hour, and subsequent heating performed in air at 1500° C. for 1 hour.

DETAILED DESCRIPTION OF THE PREFERRED EMBODIMENTS

Figure 1:
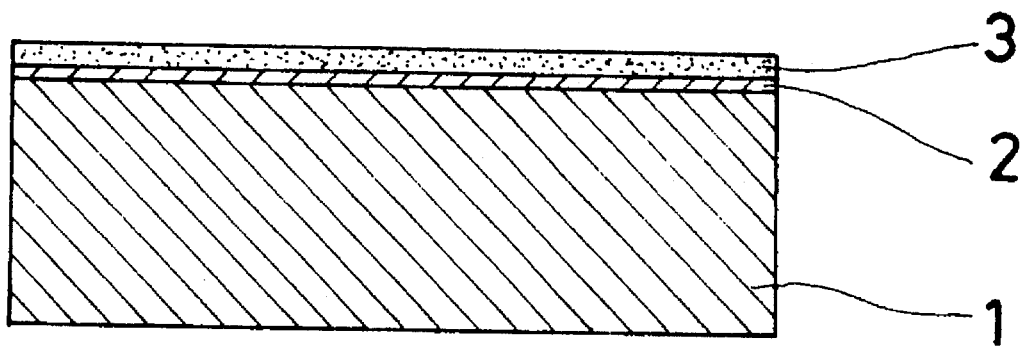
FIG. 1 is a schematic view of a lanthanoid rare earth element oxide-containing film-coated silicon carbide material according to this invention.

The advantages of this invention will be made clearer by reference to specific examples described hereinbelow. Examples 1 to 4 describe methods of manufacturing a film-coated silicon carbide material before spray coating or heat treatment. Example 5 describes a method of manufacturing a film-coated silicon carbide material after performing heat treatment.

EXAMPLE 1

A silicon carbide surface was coated with yttrium silicide essentially consisting of 45 atomic % yttrium, 30 atomic % silicon, 23 atomic % carbon and 2 atomic % oxygen by applying a slurry of yttria powder to the surface, drying, and heating in an Ar atmosphere at 1700° C.

EXAMPLE 2

A silicon carbide surface was coated with yttrium silicide (containing a large amount of yttrium carbide) consisting of 45 atomic % yttrium, 5 atomic % silicon, 48 atomic % carbon and 2 atomic % oxygen by applying a slurry of yttria powder to the surface, drying, and heating in a carbon monoxide gas atmosphere at 1700° C.

EXAMPLE 3

A silicon carbide surface was coated with yttrium silicide consisting of 30 atomic % yttrium, 60 atomic % silicon, 8 atomic % carbon and 2 atomic % oxygen by applying a slurry of yttria and silica ($SiO_2$) powder (at a molar ratio of 1:1) to the surface, drying, and heating in an Ar atmosphere at 1700° C.

EXAMPLE 4

As examples of reaction products of yttria or compound oxides of yttria and silica (at a molar ratio of 1:1) with silicon carbide, starting materials were melted together. The products were fashioned into a sputter gate, coated on silicon carbide by the sputter method, and silicon carbide materials coated with interface reaction layers having the compositions shown in Table 1 were then obtained after heat treatment in an Ar atmosphere at 1700° C.

The melting was performed by arc melting in an Ar atmosphere using tungsten electrodes. The starting materials were yttrium powder of 99.9 atomic % purity, a powdered alloy containing 90.5 atomic % yttrium and 9.5 atomic % oxygen, carbon powder of 99.9% atomic % purity and silicon powder of 99.9 atomic % purity. A mixture of these starting materials was compacted into pellets, placed on a water-cooled copper electrode hearth, and melted.

EXAMPLE 5

As examples of reaction products of ytterbium or a compound oxide of ytterbium and silica (at a molar ratio of 1:1) with silicon carbide, starting materials with compositions shown in Table 2 were melted together, fashioned into a sputter gate, and coated on silicon carbide by spattering. Silicon carbide materials coated with the interface reaction layers having the compositions shown in Table 2 were then obtained after heat treatment in an Ar atmosphere at 1700° C.

The melting was performed by arc melting in an Ar atmosphere using tungsten electrodes. The starting materials were ytterbium powder of 99.9 atomic % purity, a powdered alloy containing 90.8 atomic % ytterbium and 9.2 atomic % oxygen, carbon powder of 99.9 % atomic % purity and silicon powder of 99.9 atomic % purity. A mixture of these starting materials was compacted into pellets, placed on a water-cooled copper electrode hearth, and melted.

TABLE 1

COMPOSITION OF INTERFACE REACTION LAYER AND RESISTANCE TO DISINTEGRATION IN AIR (FOR YTTRIUM)

| No. | Y atomic % | Si atomic % | C atomic % | O atomic % | Resistance to Disintegration |
|---|---|---|---|---|---|
| A1 | 20.0 | 39.8 | 39.6 | 0.6 | Δ |
| A2 | 39.8 | 30.2 | 29.5 | 0.5 | O |
| A3 | 61.0 | 18.4 | 18.2 | 2.4 | O |
| A4 | 66.6 | 0.1 | 33.2 | 0.1 | X |
| A5 | 33.0 | 0.2 | 66.7 | 0.1 | X |
| A6 | 63.4 | 31.5 | 0.1 | 5.0 | O |
| A7 | 48.3 | 48.7 | 0.2 | 3.8 | O |
| A8 | 32.8 | 66.9 | 0.2 | 0.8 | O |
| A9 | 39.1 | 20.3 | 40.0 | 0.6 | X |
| A10 | 23.2 | 46.5 | 29.8 | 0.5 | O |
| A11 | 35.1 | 34.8 | 29.6 | 0.5 | O |
| A12 | 31.6 | 32.0 | 36.3 | 0.1 | Δ |
| A13 | 42.6 | 21.5 | 35.2 | 0.7 | Δ |
| A14 | 24.9 | 24.8 | 50.2 | 0.1 | X |
| A15 | 42.1 | 41.7 | 15.5 | 0.7 | O |

Note:
Materials marked by X also showed good adhesion properties when they were formed.
O: Did not disintegrate even after 24 hours
Δ: Disintegrates within 24 hours
X: Disintegrates within 1 hour

TABLE 2

COMPOSITION OF INTERFACE REACTION LAYER AND RESISTANCE TO DISINTEGRATION IN AIR (FOR YTTRIUM)

| No. | Yb atomic % | Si atomic % | C atomic % | O atomic % | Resistance to Disintegration |
|---|---|---|---|---|---|
| B1 | 20.2 | 40.1 | 39.2 | 0.5 | Δ |
| B2 | 39.1 | 30.6 | 29.7 | 0.6 | O |
| B3 | 60.4 | 18.2 | 19.2 | 2.2 | O |
| B4 | 66.3 | 0.2 | 33.4 | 0.1 | X |
| B5 | 32.6 | 0.3 | 67.0 | 0.1 | X |
| B6 | 63.7 | 32.0 | 0.1 | 4.2 | O |
| B7 | 49.3 | 48.7 | 0.1 | 2.9 | O |
| B8 | 33.8 | 65.4 | 0.2 | 0.6 | O |
| B9 | 38.8 | 20.3 | 40.2 | 0.7 | X |
| B10 | 24.9 | 45.2 | 29.6 | 0.3 | O |
| B11 | 36.3 | 34.1 | 29.4 | 0.2 | O |
| B12 | 31.8 | 31.0 | 36.1 | 1.1 | Δ |
| B13 | 42.6 | 21.5 | 35.2 | 0.5 | Δ |
| B14 | 25.6 | 25.3 | 48.9 | 0.2 | X |
| B15 | 42.6 | 42.2 | 14.5 | 1.7 | O |

Note:
Materials marked by X also showed good adhesion properties when they were formed.
O: Did not disintegrate even after 24 hours
Δ: Disintegrates within 24 hours
X: Disintegrates within 1 hour The yttrium silicide-coated silicon carbide materials manufactured in Examples 1 and 3 did not disintegrate into powder even when exposed to air for more than 24 hours; however, the silicon carbide coated with the yttrium silicide manufactured in Example 2 (which contained a large amount of yttrium carbide) disintegrated within 1 hour, although the film adhered well when it was made. Further, it is seen from Table 1, which shows the results of tests performed on the samples manufactured in Example 4, that if the principal components of the yttrium silicide are yttrium and silicon, and the remainder contains no more than 30 atomic % carbon and 5 atomic % oxygen, this disintegration is prevented.

Concerning the samples manufactured in Example 5 above, it is seen from Table 2 which shows the results of a disintegration test in air that if the principal components of the ytterbium silicide are ytterbium and silicon, and the remainder contains no more than 30% atomic % carbon and 5 atomic % oxygen, disintegration is prevented.

From the results for yttria and ytterbium, the same effect may be expected in the case of lanthanoid type metal elements.

EXAMPLE 6

The structure of the Ln oxide-containing film-coated silicon material according to this invention will now be described with reference to FIG. 1.

In FIG. 1, 1 is a silicon carbide substrate, 2 is an Ln silicide layer, and 3 is a Ln oxide-containing film. The Ln silicide layer 2 is the layer formed in Example 4 above.

Ln oxide-containing film-coated silicon carbides were manufactured by plasma spray coating of various Ln oxide-containing films on a silicon carbide substrate whose surface had already been coated with the Ln silicide of the aforesaid examples, and on a silicon carbide substrate that had received no surface treatment at all. The plasma thermal spraying was performed under atmospheric pressure using argon and helium as plasma gas, and argon as carrier gas. Some of the materials according to this invention were then subjected to a heat treatment comprising heating in argon gas at 1700° C. for 1 hour, followed by heating in air at 1500° C. for 1 hour. The details of the treatment performed on these materials are summarized in Table 3.

spray coated film did not adhere, cracks appeared in the film and the film peeled away, however in the case of this invention, the Ln oxide-coated film remained adhering to the substrate. Regarding the state of the materials after heating, the films coating the comparison materials, which had been incompletely formed, were found to have cracked and peeled. Also, silicon oxide air bubbles formed on the surface of the silicon carbide substrate, the surface was rough and a weight loss occurred. In the case of all the materials of this invention, however, there was no change of external appearance and only a slight weight loss. In particular, there was found to be less weight change in samples which had received heat treatment after plasma spray coating as compared to samples which had not.

TABLE 3

| No. | Classification | Substrate*[1] | State of Surface | Chemical Composition of Film due to Plasma Jet Flame Coating | | Heat Treatment After Plasma Spray Coating 1700' C × 1 hour (Ar) 1500' C × 1 hour (air) |
|---|---|---|---|---|---|---|
| 1 | This | SiC | Formation of yttrium silicide layer (Ex. 1) | $Y_2SiO_5$ | 100% | No |
| 2 | invention | sintered | Composition: (45)Y-(30)(Si-(23)C- | | | Yes |
| 3 | | body | (2)O (atomic %) | $Y_2SiO_5$ | 50% | No |
| 4 | | | Thickness: Approx. 0.02 mm | $Y_2Si_2O_7$ | 50% | Yes |
| 5 | | | Formation of yttrium silicide layer (Ex. 2) | $Y_2SiO_5$ | 100% | No |
| 6 | | | Composition: (45)Y-(5)Si-(48)C- | | | Yes |
| 7 | | | (2)O (atomic %) | $Y_2SiO_5$ | 50% | No |
| 8 | | | Thickness: Approx. 0.02 mm | $Y_2Si_2O_7$ | 50% | Yes |
| 9 | | | Formation of ytterbium silicide layer | $Yb_2SiO_5$ | 100% | No |
| 10 | | | (Ex. 4, B-15 in Table 2) | | | Yes |
| 11 | | | Composition: (42.6)Yb-(42.2)(Si- | $Yb_2SiO_5$ | 50% | No |
| 12 | | | (14.5)C-(1.7)O (atomic %) | $Yb_2Si_2O_7$ | 50% | Yes |
| | | | Thickness: Approx. 0.02 mm | | | |
| 13 | | | Formation of ytterbium silicide layer | $Yb_2SiO_5$ | 100% | No |
| 14 | | | (Ex. 4. B-9 in Table 2) | | | Yes |
| 15 | | | Composition: (38.8)Yb-(20.3)Si- | $Yb_2SiO_5$ | 50% | No |
| 16 | | | (40.2)C-(0.7)O (atomic %) | $Yb_2Si_2O_7$ | 50% | Yes |
| | | | Thickness: Approx. 0.02 mm | | | |
| 17 | Comparative | | Untreated | $Y_2SiO_5$ | 100% | No |
| 18 | Examples | | | $Yb_2SiO_5$ | 100% | No |

*[1]The dimensions of the SiC substrate are 30 × 50 × 2t mm; the thickness of the Spray-coated film is approx. 0.1 mm Table 4 shows the results of a plasma thermal spray test followed by two 90 minute heating cycles in air at 1700° C. In the case of both of the comparative examples, the plasma

TABLE 4

| | | | | | | Oxidation Test (1700' C, 90 min × 2 cycles) | | |
|---|---|---|---|---|---|---|---|---|
| No. | Classification | State of Surface | Chemical Composition of Film due to Plasma Spray Coating | | Heat Treatment | State of Film | Change of Appearance | Change of Weight (g) Before Test / After Test |
| 1 | This | Formation of | $Y_2SiO_5$ | 100% | No | Adheres to | Almost | 9.95 / 9.87 |
| 2 | invention | yttrium | | | Yes | substrate | none | 9.82 / 9.84 |
| 3 | | silicide layer | $Y_2SiO_5$ | 50% | No | | | 9.86 / 9.78 |
| 4 | | (45)Y-(30)(Si- | $Y_2Si_2O_7$ | 50% | Yes | | | 9.94 / 9.92 |
| | | (23)C-(2)O (atomic %) | | | | | | |

TABLE 4-continued

| No. | Classification | State of Surface | Chemical Composition of Film due to Plasma Spray Coating | | Heat Treatment | State of Film | Oxidation Test (1700° C, 90 min × 2 cycles) | | |
|---|---|---|---|---|---|---|---|---|---|
| | | | | | | | Change of Appearance | Change of Weight (g) | |
| | | | | | | | | Before Test | After Test |
| 5 | | Formation of yttrium silicide layer (45)Y-(5)Si-(48)C-(2)O (atomic %) | $Y_2SiO_5$ | 100% | No | | | 9.90 | 9.81 |
| 6 | | | | | Yes | | | 9.91 | 9.88 |
| 7 | | | $Y_2SiO_5$ | 50% | No | | | 9.88 | 9.78 |
| 8 | | | $Y_2Si_2O_7$ | 50% | Yes | | | 9.93 | 9.90 |
| 9 | | Formation of ytterbium silicide layer (42.6)Yb-(42.2)Si-(14.5)C-(1.7)O | $Yb_2SiO_5$ | 100% | No | | | 9.76 | 9.65 |
| 10 | | | | | Yes | | | 9.78 | 9.81 |
| 11 | | | $Yb_2SiO_5$ | 50% | No | | | 9.68 | 9.47 |
| 12 | | | $Yb_2Si_2O_7$ | 50% | Yes | | | 9.90 | 9.95 |
| 13 | | Formation of ytterbium silicide layer (38.8)Yb-(20.3)Si-(40.2)C-(0.7)O (atomic %) | $Yb_2SiO_5$ | 100% | No | | | 9.82 | 9.71 |
| 14 | | | | | Yes | | | 9.84 | 9.79 |
| 15 | | | $Yb_2SiO_5$ | 50% | No | | | 9.90 | 9.79 |
| 16 | | | $Yb_2Si_2O_7$ | 50% | Yes | | | 9.86 | 9.81 |
| 17 | Comparative Examples | Untreated | $Y_2SiO_5$ | 100% | No | Shows cracking and peeling | $SiO_2$ surface bubbles | 9.62 | 8.73 |
| 18 | | | $Yb_2SiO_5$ | 100% | | | Substrate wear | 9.58 | 8.57 |

This invention therefore provides a lanthanoid rare earth element oxide film-coated silicon carbide material having excellent anti-oxidation properties, and a lanthanoid silicide-coated silicon carbide material which is a sort of precursor to the silicon carbide material and whose lanthanoid silicide coating shows little disintegration into powder. It is therefore of great significance from the viewpoint of industrial use.

What is claimed:

1. A heat-resistant structural composite comprising a substrate, the surface of which comprises silicon carbide; and a layer of a lanthanoid silicide disposed on said silicon carbide surface of said substrate, said lanthanoid silicide being a reaction product of an oxide of a lanthanoid rare earth element or yttrium with silicon carbide or a reaction product of a compound oxide of a lanthanoid rare earth element or yttrium and silicon with silicon carbide.

2. A heat-resistant structural composite as defined in claim 1, wherein major components of said silicide layer are a lanthanoid rare earth element or yttrium and silicon, an amount of carbon is 30 atomic % or less, and the amount of oxygen is 5 atomic % or less.

3. A heat-resistant structural composite as defined in claim 1, wherein a surface of the silicide layer is further covered with an oxide of a lanthanoid rare earth element or yttrium or with a compound oxide of a lanthanoid rare earth element or yttrium and silicon, such that the silicide layer is between the oxide and the silicon carbide material.

4. A heat-resistant structural composite as defined in claim 1, wherein said substrate comprises a carbon material other than silicon carbide, and silicon carbide which covers a surface of the carbon material.

5. A heat-resistant structural composite as defined in claim 4, wherein said carbon material is a carbon/carbon composite.

6. A heat-resistant structural composite as defined in claim 3, wherein said substrate comprises a carbon material other than silicon carbide, and silicon carbide which covers a surface of the carbon material.

7. A heat-resistant structural composite as defined in claim 6, wherein said carbon material is a carbon/carbon composite.

8. A heat-resistant structural composite, produced by the process comprising coating a surface of a lanthanoid silicide-coated silicon carbide material as defined in claim 1 by means of plasma spraying with an oxide of a lanthanoid rare earth element or yttrium or with a compound oxide of a lanthanoid rare earth element or yttrium and silicon.

9. A heat-resistant structural composite produced by the process comprising (i) coating a surface of said lanthanoid silicide-coated silicon carbide material as defined by claim 1 by means of plasma spraying with an oxide of a lanthanoid rare earth element or yttrium or with a compound oxide of a lanthanoid rare earth element or yttrium and silicon, and (ii) heating in air or in an inert gas atmosphere, whereby fineness and adhesion of said oxide coating are improved.

10. A heat-resistant structural composite as defined in claim 1, wherein yttrium is used to form the silicide.

11. A heat-resistant structural composite as defined in claim 1, wherein ytterbium is used to form the silicide.

12. A heat-resistant structural composite as defined in claim 1, wherein the silicide is a reaction product of an oxide of a lanthanoid rare earth element or yttrium with silicon carbide.

13. A heat-resistant structural composite as defined in claim 1, wherein the silicide is a reaction product of a compound oxide of a lanthanoid rare earth element or yttrium and silicon with silicon carbide.

14. A heat-resistant structural composite as defined in claim 2, wherein the silicide contains 20 to 66.6 atomic % of lanthanoid rare earth element or yttrium and 18.2 to 66.9 atomic % of silicon.

15. A heat-resistant structural composite as defined in claim 14, wherein the lanthanoid rare earth element or yttrium is yttrium.

16. A heat-resistant structural composite as defined in claim 14, wherein the lanthanoid rare earth element or yttrium is ytterbium.

17. A heat-resistant structural composite as defined in claim 2, wherein a surface of the silicide is further covered with an oxide of a lanthanoid rare earth element or yttrium or with a compound oxide of a lanthanoid rare earth element or yttrium and silicon, such that the silicide is between the oxide and the silicon carbide material.

18. A heat-resistant structural compound as defined in claim 14, wherein a surface of the silicide is further covered with an oxide of a lanthanoid rare earth element or yttrium or with a compound oxide of a lanthanoid rare earth element or yttrium and silicon, such that the silicide is between the oxide and the silicon carbide material.

* * * * *